US011968161B2

(12) United States Patent
Ushinohama

(10) Patent No.: US 11,968,161 B2
(45) Date of Patent: Apr. 23, 2024

(54) STORAGE MEDIUM, SYSTEM, SETTING METHOD, AND INFORMATION PROCESSING APPARATUS, FOR CHANGING NOTIFICATION SETTINGS RELATING TO A PLURALITY OF DEVICES

(71) Applicant: CANON KABUSHIKI KAISHA, Tokyo (JP)

(72) Inventor: Takuya Ushinohama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,657

(22) Filed: Nov. 11, 2022

(65) Prior Publication Data
US 2023/0155973 A1    May 18, 2023

(30) Foreign Application Priority Data

Nov. 16, 2021 (JP) ................................. 2021-186701

(51) Int. Cl.
*G06F 15/16* (2006.01)
*H04L 51/224* (2022.01)

(52) U.S. Cl.
CPC ................................ *H04L 51/224* (2022.05)

(58) Field of Classification Search
CPC ............... H04L 51/224; H04L 41/0803; H04L 41/0813; G06F 15/173
USPC ........................................ 709/206, 204, 223
See application file for complete search history.

(56) References Cited

U.S. PATENT DOCUMENTS

| 5,666,294 | A | * | 9/1997 | Takada | G06F 11/3006 |
| | | | | | 702/182 |
| 2003/0212783 | A1 | * | 11/2003 | Sakai | H04L 41/0806 |
| | | | | | 709/223 |
| 2003/0229691 | A1 | * | 12/2003 | Ishimoto | H04L 51/48 |
| | | | | | 709/223 |
| 2016/0174345 | A1 | * | 6/2016 | Kelly | G08C 17/02 |
| | | | | | 315/131 |
| 2017/0346967 | A1 | * | 11/2017 | Eveilleau | G06F 3/1229 |
| 2019/0075331 | A1 | * | 3/2019 | Coburn, IV | H04N 21/4363 |
| 2020/0066110 | A1 | * | 2/2020 | Nelson | G07F 19/205 |

(Continued)

FOREIGN PATENT DOCUMENTS

| JP | 2005-63263 A | 3/2005 |
| JP | 2015-204012 A | 11/2015 |
| JP | 2021-18781 A | 2/2021 |

(Continued)

*Primary Examiner* — Kaylee J Huang
(74) *Attorney, Agent, or Firm* — Canon U.S.A., Inc. IP Division

(57) ABSTRACT

To reduce user effort in setting notifications based on information from a plurality of devices. A setting method includes registering a plurality of devices, registering devices in the plurality of devices in association with groups, and changing settings of a plurality of notifications to be transmitted to a display of the information processing apparatus, the notifications based on information from a plurality of devices associated with a group, where the settings are changed in such a manner that for each of the devices in the group, the settings are changed all at once, without changing a setting of another notification to be transmitted to the display of the information processing apparatus, the other notification based on information from a device of the plurality of devices that is not in the group.

13 Claims, 16 Drawing Sheets

(56) References Cited

U.S. PATENT DOCUMENTS

2020/0241493 A1* 7/2020 Milevschi .......... G05B 23/0272

FOREIGN PATENT DOCUMENTS

| JP | 2021-131756 A | 9/2021 |
| WO | 2020017051 A1 | 1/2020 |
| WO | WO-2022198211 A1 * | 9/2022 |

* cited by examiner

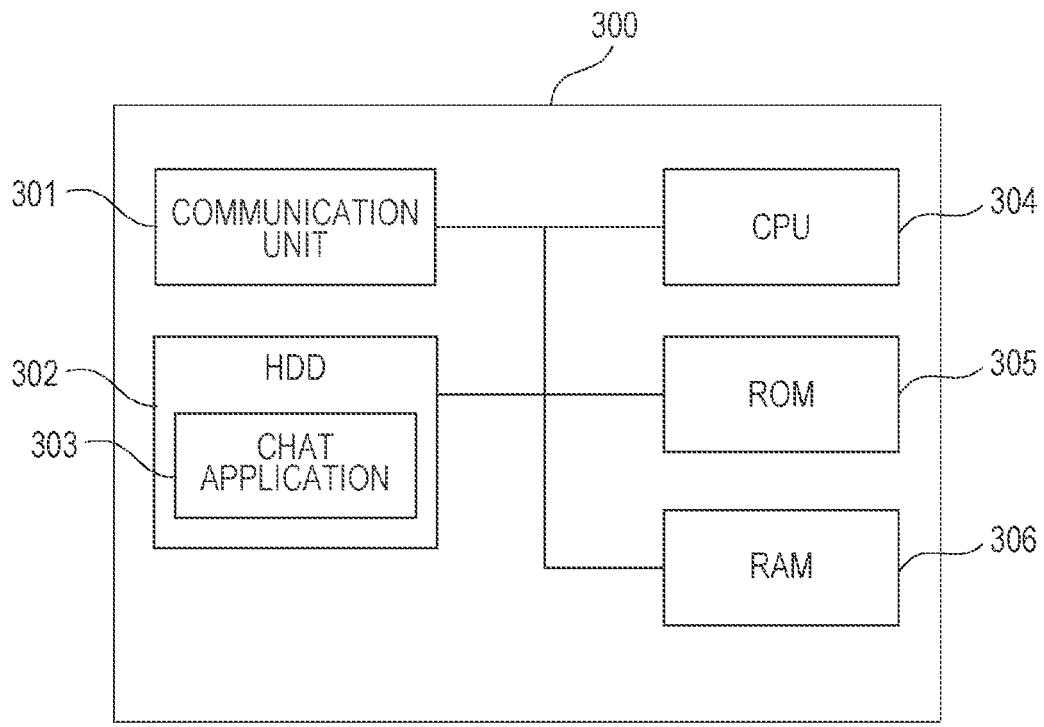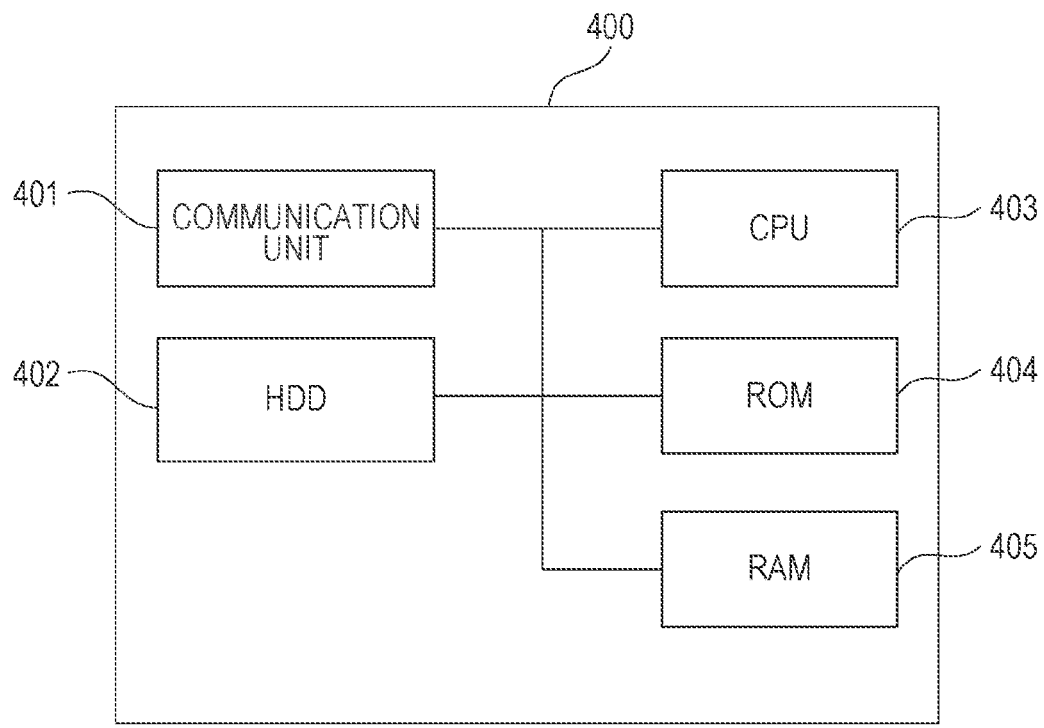

FIG. 7A

≡ DEVICE GROUP

| NAME | GROUP |
|---|---|
| HEAD OFFICE 1F FLOOR MULTIFUNCTIONAL DEVICE | HEAD OFFICE PRINTER |
| STUDY ROOM PRINTER | NOT GROUPED |
| HEAD OFFICE 2F FLOOR MULTIFUNCTIONAL DEVICE | HEAD OFFICE PRINTER |
| HOME KITCHEN RICE COOKER | NOT GROUPED |
| HOME WASHING MACHINE | NOT GROUPED |
| BRANCH A PRINTER | NOT GROUPED |

(REGISTER NEW GROUP)

FIG. 7B

≡ REGISTER DEVICE GROUP

GROUP NAME
[ HOME ELECTRICAL APPLIANCE ]

CONNECTED DEVICE

| HEAD OFFICE 1F FLOOR MULTIFUNCTIONAL DEVICE | ☐ |
| STUDY ROOM PRINTER | ☑ |
| HEAD OFFICE 2F FLOOR MULTIFUNCTIONAL DEVICE | ☐ |
| HOME KITCHEN RICE COOKER | ☑ |
| HOME WASHING MACHINE | ☑ |

(REGISTER)

STORAGE MEDIUM, SYSTEM, SETTING METHOD, AND INFORMATION PROCESSING APPARATUS, FOR CHANGING NOTIFICATION SETTINGS RELATING TO A PLURALITY OF DEVICES

BACKGROUND

Field

The present disclosure relates to a storage medium, a system, a setting method, and an information processing apparatus.

Description of the Related Art

A monitoring system capable of monitoring the statuses of a plurality of devices, such as an air conditioner, a television, and a refrigerator, by using a terminal, such as a smartphone or a tablet terminal, is disclosed in related art (see International Publication No. WO2020/017051).

In such monitoring system, a notification server obtains status information regarding the plurality of devices via a network. When the notification server obtains the status information regarding the devices, the notification server transmits, to a terminal, notifications about information in the status information regarding the devices and the consumed power of the devices. The user can find out the statuses of the devices remotely using a notification screen presented on the terminal. The monitoring system can set notification conditions, such as the time zone and the day of week the notifications are to be sent, for each of the plurality of devices. This allows the user to turn on or off the notification for each device by setting notification conditions for the device.

In the related art, to turn notifications on or off, the notification setting of each of the plurality of devices needs to be changed.

SUMMARY

Various embodiments of the present disclosure provide a computer-readable storage medium storing a program for causing a computer of an information processing apparatus to execute a control method. The control method includes registering a plurality of devices and registering devices in the plurality of devices in association with groups. The control method further includes changing settings of a plurality of notifications to be transmitted to a display of the information processing apparatus, the notifications based on information from a plurality of devices associated with a group, where the settings are changed in such a manner that for each of the devices in the group, the settings are changed all at once, without changing a setting of another notification to be transmitted to the display of the information processing apparatus, the other notification based on information from a device of the plurality of devices that is not in the group.

Further features of the present disclosure will become apparent from the following description of example embodiments with reference to the attached drawings.

BRIEF DESCRIPTION OF THE DRAWINGS

FIG. 3 is a block diagram illustrating the hardware configuration of a chat server according to one embodiment.

FIG. 4 is a block diagram illustrating the hardware configuration of a device management server according to one embodiment.

FIGS. 7A and 7B are diagrams illustrating device-group registration screens of the terminal according to one embodiment.

DESCRIPTION OF THE EMBODIMENTS

Example embodiments of the present disclosure will be described in detail hereinbelow with reference to the drawings. It is to be understood that the following example embodiments do not limit the scope of the invention according to the claims and that not all of combinations of the features described in the embodiments are absolutely necessary for the solution of every embodiment of the present disclosure.

Figure 1:
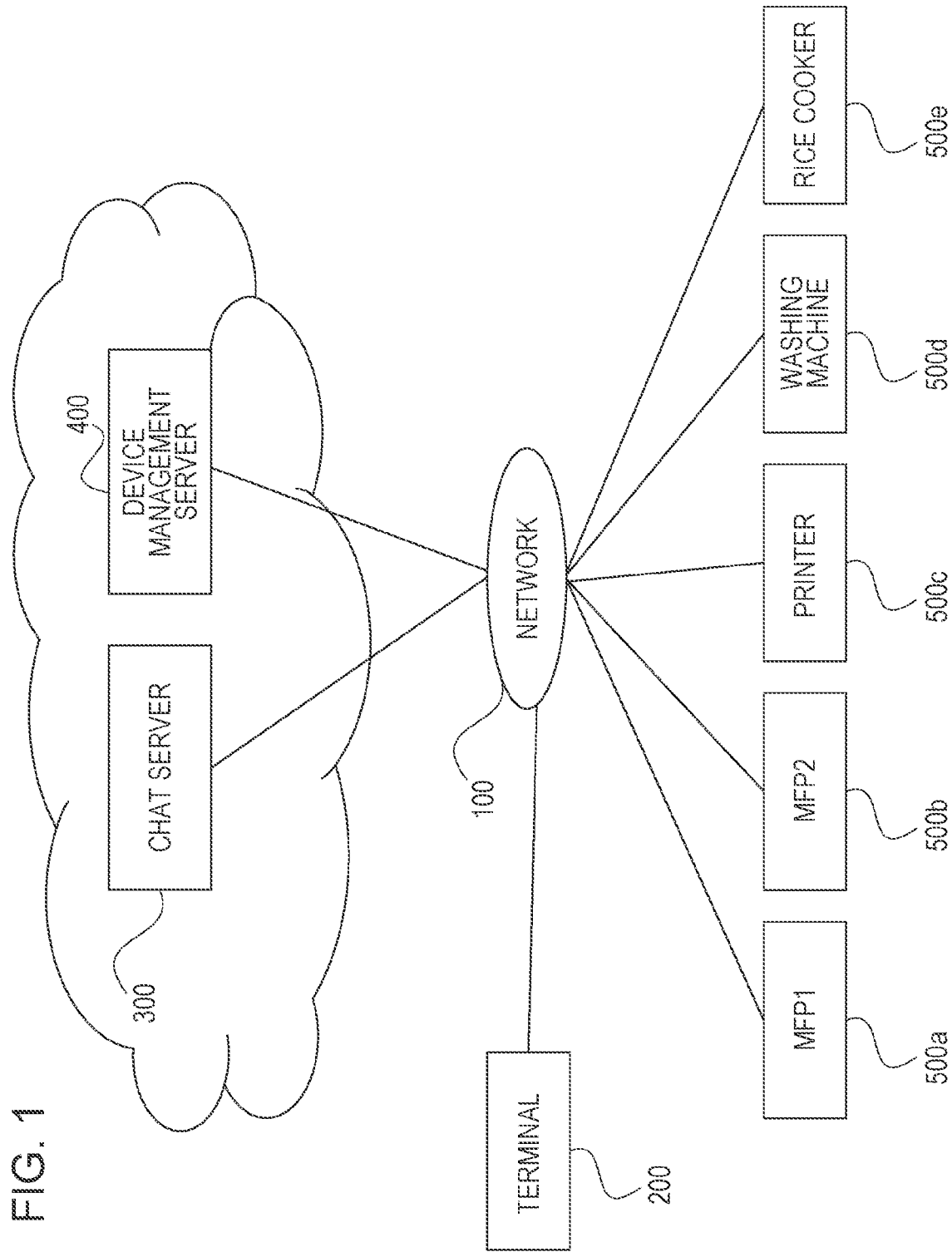
FIG. 1 is a diagram illustrating a system configuration according to one embodiment.

FIG. 1 is a diagram showing an example of the system configuration of the present disclosure. The system configuration of this embodiment is such that a terminal 200, which is an example of an information processing apparatus, and a plurality of connected devices 500a to 500e are communicably connected to a device management server 400 and a chat server 300 via a network 100. The network 100 of this embodiment may be either the Internet or a local area network (LAN). The network 100 may be wired or wireless. The terminal 200 is a user-owned electronic device, such as a personal computer (PC), a smartphone, or a tablet PC. The user monitors the statuses of a plurality of connected devices and gives instructions for control via the terminal 200. The chat server 300 transmits various notifications about the statuses of the connected devices transmitted from the device management server 400 to the terminal 200. The device management server 400 monitors and controls the operations of the plurality of connected devices via the network 100. The device management server 400 also obtains the statuses of the connected devices and transmits a notification message containing the statuses of the devices to the chat server 300 to notify the user of the statuses. The chat server 300 and the device management server 400 may be constituted by one server.

Examples of the connected devices include various electrical products installed in offices or houses, such as multi-functional peripherals (MFPs), lights, air conditioners, refrigerators, electronic ovens, and televisions. These connected devices are communicably connected to the device management server 400 via the network 100. The connected devices can receive control instructions and transmit status information from/to the device management server 400 by registering registered-unit information including information on the connected devices with the device management server 400. In this embodiment, an MFP 1 (500*a*), an MFP 2 (500*b*), a printer (500*c*), a washing machine (500*d*), and a rice cooker (500*e*) are connected to the device management server 400 via the network 100. In the following description, in the case where common processes are performed in the connected devices 500*a* to 500*e*, the connected devices 500*a* to 500*e* are collectively described as a connected device 500.

Figure 2:
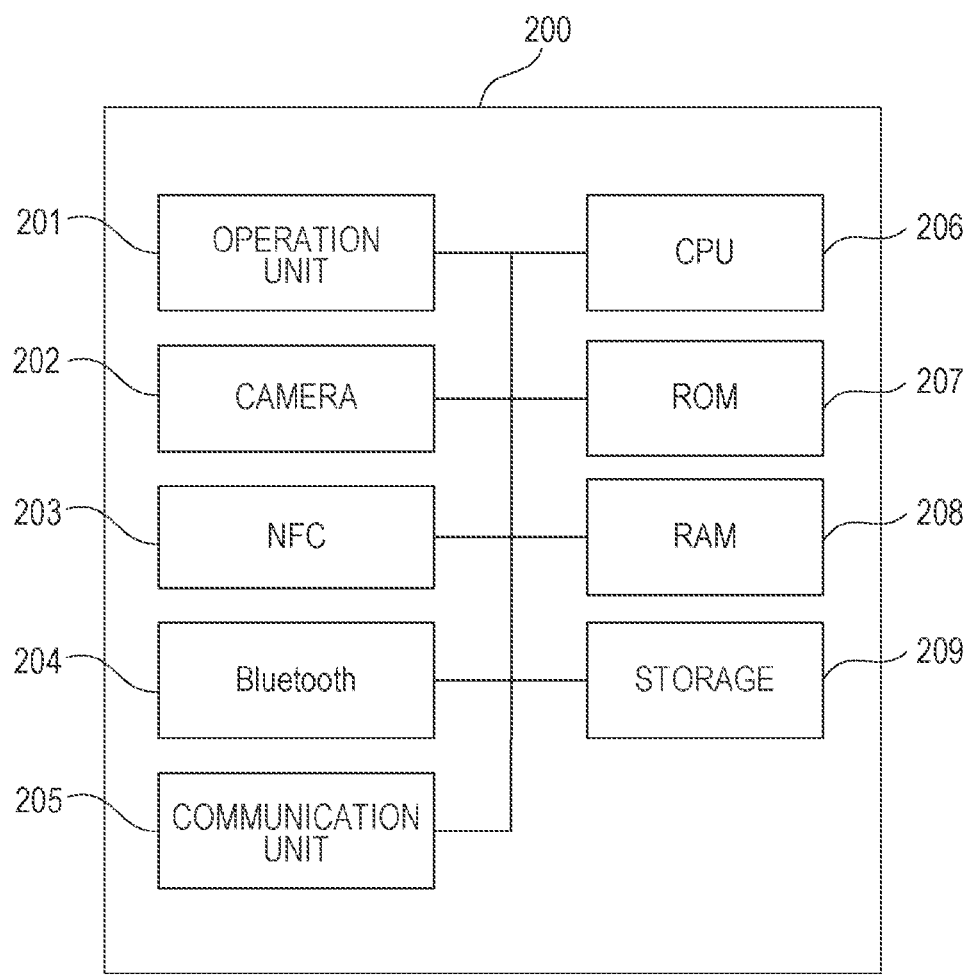
FIG. 2 is a block diagram illustrating the hardware configuration of a terminal according to one embodiment.

FIG. 2 is a diagram illustrating an example of the hardware configuration of the terminal 200. An operation unit 201 has a touch panel function capable of detecting a touch operation of the user and displays various screens that the operating system (OS) and a chat application provide. The user can input desired operator instructions to the terminal 200 by inputting touch operations to the operation unit 201. The operator instructions may be input to the terminal 200 using hardware keys (not shown). A camera 202 captures an image according to an image capturing instruction of the user. The terminal 200 can transmit and receive data to and from various peripheral devices via a near field communication (NFC) 203, or Bluetooth 204. A communication unit 205 communicates with the chat server 300 connected via the network 100 to receive notifications and exchange messages. The communication unit 205 may perform wired communication using Ethernet® or wireless communication, such as Wi-Fi. A central processing unit (CPU) 206 reads control programs stored in a read-only memory (ROM) 207 and executes various processes for controlling the operation of the terminal 200. The ROM 207 stores control programs. A random-access memory (RAM) 208 is used as a temporary storage area such as the main memory and a work memory of the CPU 206.

A storage 209 stores various data, such as pictures and electronic documents.

FIG. 3 is a diagram illustrating an example of the hardware configuration of the chat server 300. A communication unit 301 can transmit and receive data to and from the terminal 200 and the device management server 400 via the Internet 100. A hard disk drive (HDD) 302 stores various data, such as user information, notification messages, and image data. The HDD 302 also stores a chat application 303 for executing a chat service and can execute exchange of messages between users and give notification to a specific user. The transmission of messages and notification can be performed by designating an ID that uniquely identifies the user or an identifier that uniquely identifies the terminal 200 as an address. The user can use the chat service by registering in advance user information including the user ID and the identifier of the terminal 200 with the chat server 300. The registered user information may be shared with the device management server 400. A CPU 304 reads control programs stored in a ROM 305 and executes various processes for controlling the operation of the chat server 300. The ROM 305 stores control programs. A RAM 306 is used as a temporary storage area such as the main memory and a work memory of the CPU 304.

FIG. 4 is a diagram illustrating an example of the hardware configuration of the device management server 400. A communication unit 401 can transmit and receive data to and from the connected device 500 and the chat server 300 via the Internet 100. The communication unit 401 obtains status information indicating the status of the connected device 500. Examples of the status information include the operating status of the connected device 500, setting information, error information, and the kind of event occurred. To register a device or obtain status information on the connected device 500, user information including the user ID and the identifier of the terminal 200 need to be registered with the device management server 400 in advance. The registered user information may be shared with the chat server 300. An HDD 402 stores various data, such as user information, registered-unit information on the connected device 500 registered by the user, connected-device-group information, connected-device notification settings, and status information obtained from the connected device 500. A CPU 403 reads control programs stored in a ROM 404 and execute various processes for controlling the operation of the device management server 400. The ROM 404 stores control programs. A RAM 405 is used as a temporary storage area such as the main memory and a work memory of the CPU 403.

Figure 5:
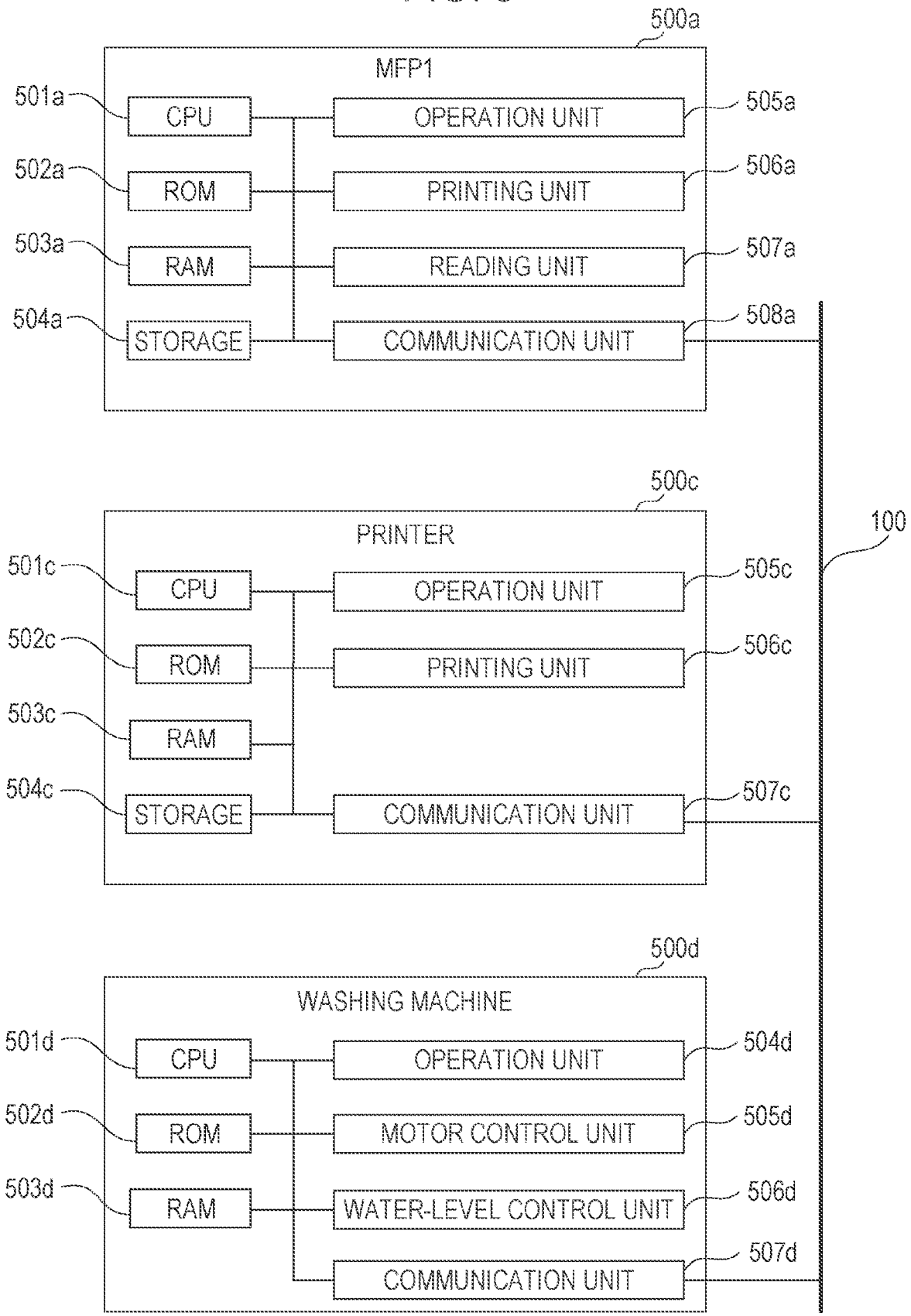
FIG. 5 is a block diagram illustrating examples of the hardware configurations of a plurality of connected devices according to one embodiment.

FIG. 5 is a diagram illustrating examples of the hardware configurations of connected devices, the MFP 1(500*a*), the printer (500*c*), and the washing machine (500*d*).

The MFP 1(500*a*) includes a CPU 501*a*, a ROM 502*a*, a RAM 503*a*, a storage 504*a*, an operation unit 505*a*, a printing unit 506*a*, a reading unit 507*a*, and a communication unit 508*a*. The CPU 501*a* controls the operation of the entire MFP 1(500*a*). The CPU 501*a* reads control programs stored in the ROM 502*a* or the storage 504*a* into the RAM 503*a* to perform various control operations, such as read control and print control. The ROM 502*a* stores control programs that can be executed by the CPU 501*a*. The RAM 503*a* is a main memory and is used as a temporary storage area for decompressing various control programs stored in a work area, the ROM 502*a*, and the storage 504*a*. The storage 504*a* stores image data, print data, various programs, and various items of setting information. In this embodiment, the storage 504*a* is a flash memory. Other examples include auxiliary storages, such as a solid state drive (SSD) and a hard disk drive (HDD). Another example is an embedded multimedia card (eMMC). The MFP 1 (500*a*) of this embodiment executes a sequence of processes, described later, that one CPU 501*a* executes using one memory (RAM 503*a*). This is however illustrative only. For example, a plurality of components, the CPU, the RAM, the ROM, and the storage, may be cooperated to execute the flowchart described later. Part of the processes may be executed using a hardware circuit, such as an application specific integrated circuit (ASIC) or a field programmable gate array (FPGA). Examples of the operation unit 505*a* include a display, such as a touch panel, and hard keys. The operation unit 505*a* displays information for the user and detects an input from the user. The printing unit 506*a* can print image data (print data) stored in the RAM 503*a* on recording paper fed from a paper cassette. The reading unit 507*a* reads an image on the document. The CPU 501*a* converts the image to image data, such as binary data. The image data generated from the image read by the reading unit 507*a* is transmitted to an external device or printed on recording paper. The communication unit 508*a* connects to the network 100. The communication unit 508*a* transits status information on the device to the device management server 400. Examples of the status information include the status of jobs, such as copying and FAX, notifications of the remaining amounts or shortage of toner and printing paper (recording materials), error information, such as a fault location, and the type of event occurred. The communication unit 508a transmits image data to an external device on the network 100 or receives print data from the terminal 200. Examples or a method of transmission and reception via the network 100 include transmission and reception via email and file transmission using another protocol (for example, a file transfer protocol (FTP), server message block (SMB), and web-based distributed authoring and versioning (WEBDAV)). Another example is transmission and reception of image data and various setting data via the network 100 from the terminal 200 by hypertext transfer protocol (HTTP) communication.

The printer (500c) includes a CPU 501c, a ROM 502c, a RAM 503c, a storage 504c, an operation unit 505c, a printing unit 506c, and a communication unit 507c. The CPU 501c controls the operation of the entire printer (500c). The CPU 501c reads control programs stored in the ROM 502c or the storage 504c into the RAM 503c to perform various control operations, such as print control. The ROM 502c stores control programs that can be executed by the CPU 501c. The RAM 503c is a main memory and is used as a temporary storage area for decompressing various control programs stored in a work area, the ROM 502c, and the storage 504c. The storage 504c stores image data, print data, various programs, and various items of setting information. In this embodiment, the storage 504c is a flash memory. Other examples include auxiliary storages, such as an SSD and an HDD. Another example is an eMMC. The printer (500c) of this embodiment executes a sequence of processes, described later, that one CPU 501c executes using one memory (RAM 503c). This is however illustrative only. For example, a plurality of components, the CPU, the RAM, the ROM, and the storage, may be cooperated to execute the flowchart described later. Part of the processes may be executed using a hardware circuit, such as an ASIC or an FPGA. Examples of the operation unit 505c include a display, such as a touch panel, and hard keys. The operation unit 505c displays information for the user and detects an input from the user. The printing unit 506c can print image data (print data) stored in the RAM 503c on recording paper fed from a paper cassette. The communication unit 507c connects to the network 100. The communication unit 507c transits status information on the device to the device management server 400. Examples of the status information include the status of a print job, notifications of the remaining amounts or shortage of toner and printing paper (recording materials), error information, such as a failure, and the type of event occurred. The communication unit 507c also receives print data from the terminal 200 on the network 100.

The washing machine (500d) includes a CPU 501d, a ROM 502d, a RAM 503d, an operation unit 504d, a motor control unit 505d, a water-level control unit 506d, and a communication unit 507d. The CPU 501d controls the operation of the entire washing machine (500d). The CPU 501d reads control programs stored in the ROM 502d into the RAM 503d to perform various control operations, such as motor control and water-level control. The ROM 502d stores control programs that can be executed by the CPU 501d. The RAM 503d is a main memory and is used as a temporary storage area for decompressing various control programs stored in a work area and the ROM 502d. Examples of the operation unit 504d include a display, such as a touch panel, and hard keys. The motor control unit 505d controls the rotational speed of the motor of the washing tub. The water-level control unit 506d controls the water level of the washing tub and controls the feeding and discharging of water. The communication unit 507d connects to the network 100. The communication unit 507d connects to the network 100. The communication unit 507d transits status information on the device to the device management server 400. Examples of the status information include operating status, error information, such as a failure, and the type of event occurred. The communication unit 507d also receives control instructions from an external device on the network 100.

Figure 6C:
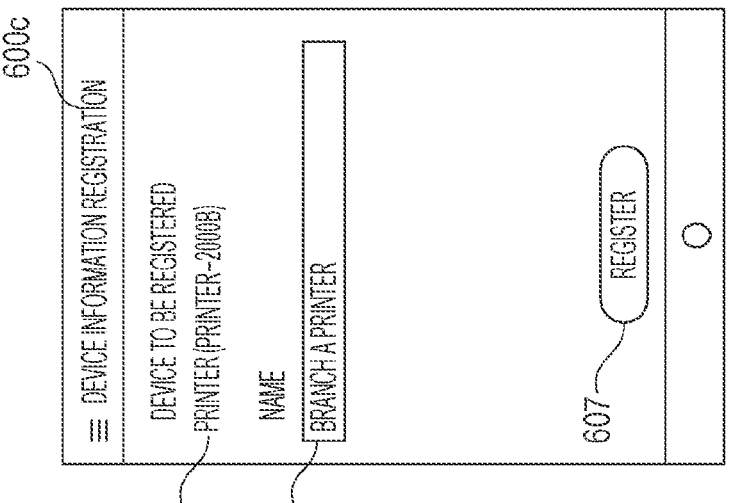
FIGS. 6A to 6C are diagrams illustrating device registration screens of the terminal according to one embodiment.
Figure 6B:
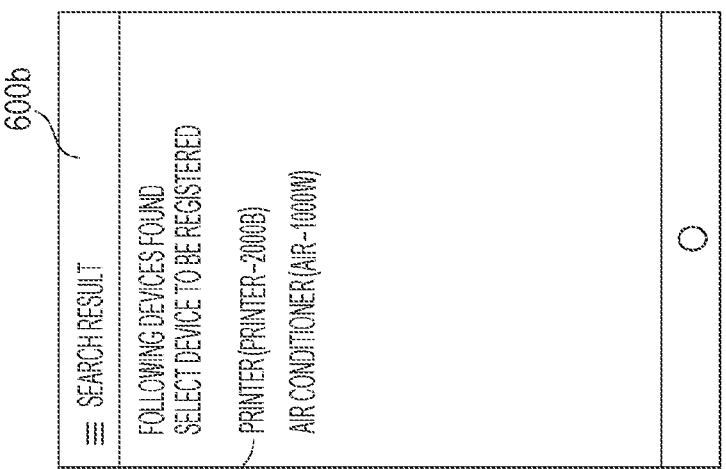
Figure 6A:
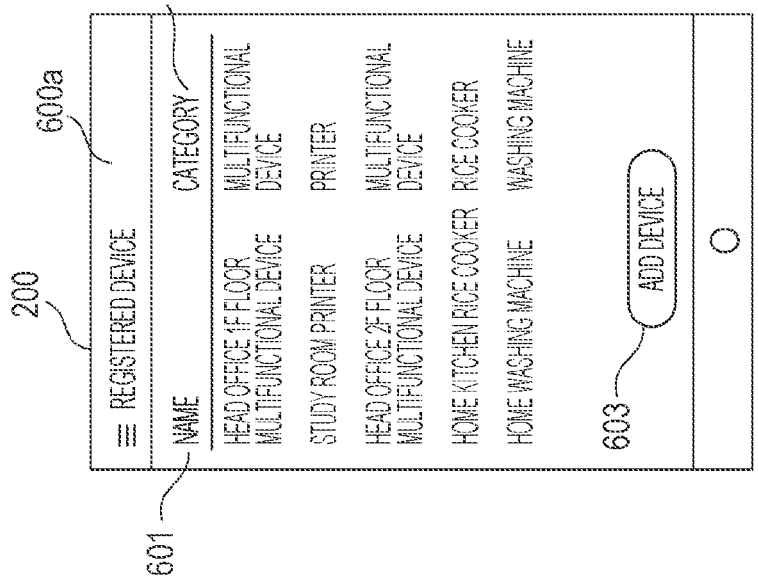

FIGS. 6A to 6C illustrate examples of screens, displayed on the operation unit 201 of the terminal 200, for registering connected devices with the device management server 400.

A screen 600a displays connected devices registered with the device management server 400, in which any given names that the user gives to the connected devices and the categories of the connected devices are listed in a column 601 and a column 602, respectively. Examples of the categories of the connected devices include a multifunctional device, a printer, a rice cooker, and a washing machine. The user registers user information with the device management server 400 in advance before registering the devices. When registering an additional device with the device management server 400, the user selects an add device button 603 displayed on the screen 600a.

A screen 600b is a screen displayed when the user selects the add device button 603, in which devices that are not registered with the device management server 400 are listed. The screen 600b displays the categories and the product names of the devices. The devices listed may be devices that are recognized via the NFC 203 or the Bluetooth 204 provided in the terminal 200 or devices on the same network. The user selects a desired device to be registered with the device management server 400 from the devices displayed on the screen 600b.

A screen 600c is a screen displayed when the user selects any one of the devices listed on the screen 600b, in which the category of the device selected on the screen 600b and the product name "printer (PRINTER-2000B)" are displayed in a field 605.

The screen 600c also displays a name field 606 for the selected device. The user enters any name in the name field 606. By entering the name and selecting a register button 607, registered-unit information is transmitted to the device management server 400, and the registration is completed. Examples of the registered-unit information include, in addition to the name entered on the screen 600c, the category, the product name, and the media access control (MAC) address of the device. The registered-unit information further includes identification information that is uniquely assigned to the device, such as a serial number, and information on the user who registered.

FIGS. 7A and 7B are diagrams illustrating examples of screens for connected-device group registration displayed on the operation unit 201 of the terminal 200. The group registration means that a user registers one or more connected devices together as one group on the device management server 400.

A screen 700a is a screen that displays connected-device group information, in which connected devices registered with the device management server 400 are displayed. In this embodiment, the screen 700a displays a list of any names the user gives to the connected devices and a list of groups to which the connected devices belong in a column 701 and a column 702, respectively. To register a new group with the device management server 400, the user selects a new-group register button 703 displayed on the screen 700a.

A screen 700b is a screen displayed when the user selects the new-group register button 703. The screen 700b displays a group name field 704 in which the name of a group to be newly created, in which the user can enter any group name. A connected-device field 705 displays connected devices and check boxes 706 for selecting whether to include the connected devices in the new group. By the user checking the connected devices to be included the new group and thereafter selecting a register button 707, the group information is transmitted to the device management server 400, and the group registration is completed. Examples of the group information include the group name entered on the screen 700b, the registered-unit information on the checked connected devices, and information on the user who created the group. In the example of the screen 700b, three connected devices, "study room printer", "home kitchen rice cooker", and "home washing machine", are included the group named "home electrical appliance". In this embodiment, connected devices belong to one group. Alternatively, the connected devices may be included in a plurality of hierarchical groups. For example, "head office 1F multifunctional device may be included in two groups, a "head office printer" group and a "head office 1F printer" group, which is a subgroup of the "head office printer" group.

Figure 8:
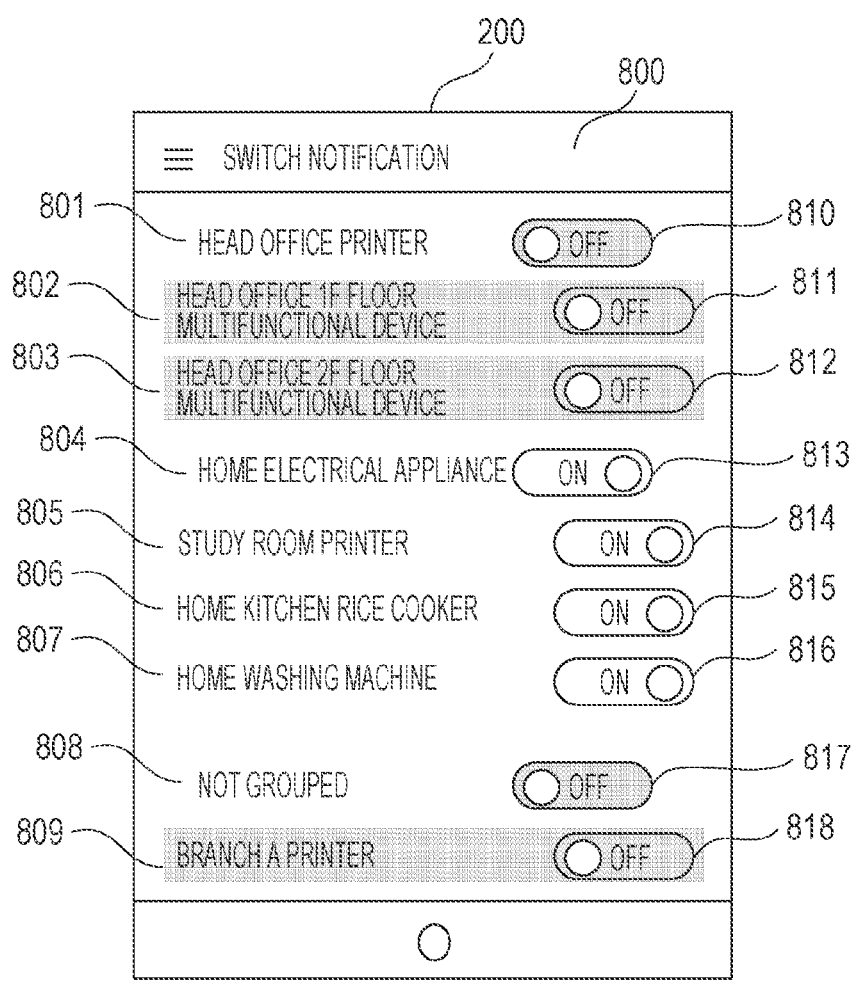
FIG. 8 is a diagram illustrating a notification switching setting screen of the terminal according to one embodiment.

FIG. 8 is a diagram illustrating an example of a notification setting screen displayed on the operation unit 201 of the terminal 200. The notification setting screen 800 allows switching of notification settings on whether to display various notifications of the status of the connected device 500 generated by the device management server 400 on the terminal 200. The notification settings set on the notification setting screen 800 are transmitted to the device management server 400 for storage.

The notification setting screen 800 displays groups registered with the device management server 400 and connected devices that belong to the groups. The notification setting screen 800 also displays toggle switches for group notification switch setting on whether to display notifications including status information on all the connected devices that belong to the groups on the terminal 200. The user can switch group notification settings all at once so as not to display notifications on all the connected devices included in the group by turning "OFF" the toggle switches for group notification switch settings. Likewise, the user can switch the group notification settings all at once so as to display notifications on all the connected devices included in the group by turning "ON" the toggle switches for group notification switch settings. For example, the notification setting screen 800 displays a "head office printer" group 801, which is a group registered with the device management server 400, a "head office 1F multifunctional device" 802, and a "head office 2F multifunctional device" 803 that belong to the group. The user can turn "OFF" the respective notification settings 811 and 812 of the connected devices 802 and 803 that belong to the "head office printer" group 801 all at once by turning "OFF" a group notification switch setting 810 of the "head office printer" group 801. Likewise, the notification setting screen 800 displays a "home electrical appliance" group 804 and all the connected devices that belong to the "home electrical appliance" group 804, a "study room printer" 805, a "home kitchen rice cooker" 806, and a "home washing machine" 807. The user can turn "ON" the respective notification settings 814, 815, and 816 of the connected devices 805, 806, and 807 that belong to the "home electrical appliance" group 804 all at once by turning "ON" a group notification switch setting 813 of the "home electrical appliance" group 804. The connected devices that do not belong to any groups may be collectively displayed as "not grouped" 808, as in the notification setting screen 800.

A group notification switch setting 817 for the "not grouped" 808 is "OFF", and a notification setting 818 for a "branch A printer" 809 that does not belong to any group is turned "OFF" in cooperation. Alternatively, a notification setting different from the group notification switch setting of the group to which the connected device belongs may be made by individually changing the notification settings of the connected devices. For example, even when the group notification switch setting 813 of the "home electrical appliance" group 804 is "ON", only the notification setting 814 of the study room printer 805 may be turned "OFF". If the connected devices belong to a plurality of hierarchical groups, subgroup notification switch settings and notification settings for all connected devices that belong to the subgroup may be switched all at once by switching the group notification switch setting for a higher group. The group notification switch settings of subgroups may be switched to notification settings different from a higher group notification switch setting. For example, the group notification switch setting of a higher group, the "head office printer" group, is turned "ON", and in this state, the group notification switch setting of the subgroup, "head office 1F printer" group, may be turned "OFF", and the group notification switch setting of the "head office 2F printer" may be turned "ON". In this case, the notification settings of the connected devices that belong to the "head office 1F printer" group are tuned "OFF" all at once, and the notification settings of the connected devices that belong to the "head office 2F printer" group are tuned "ON" all at once.

Figure 18:
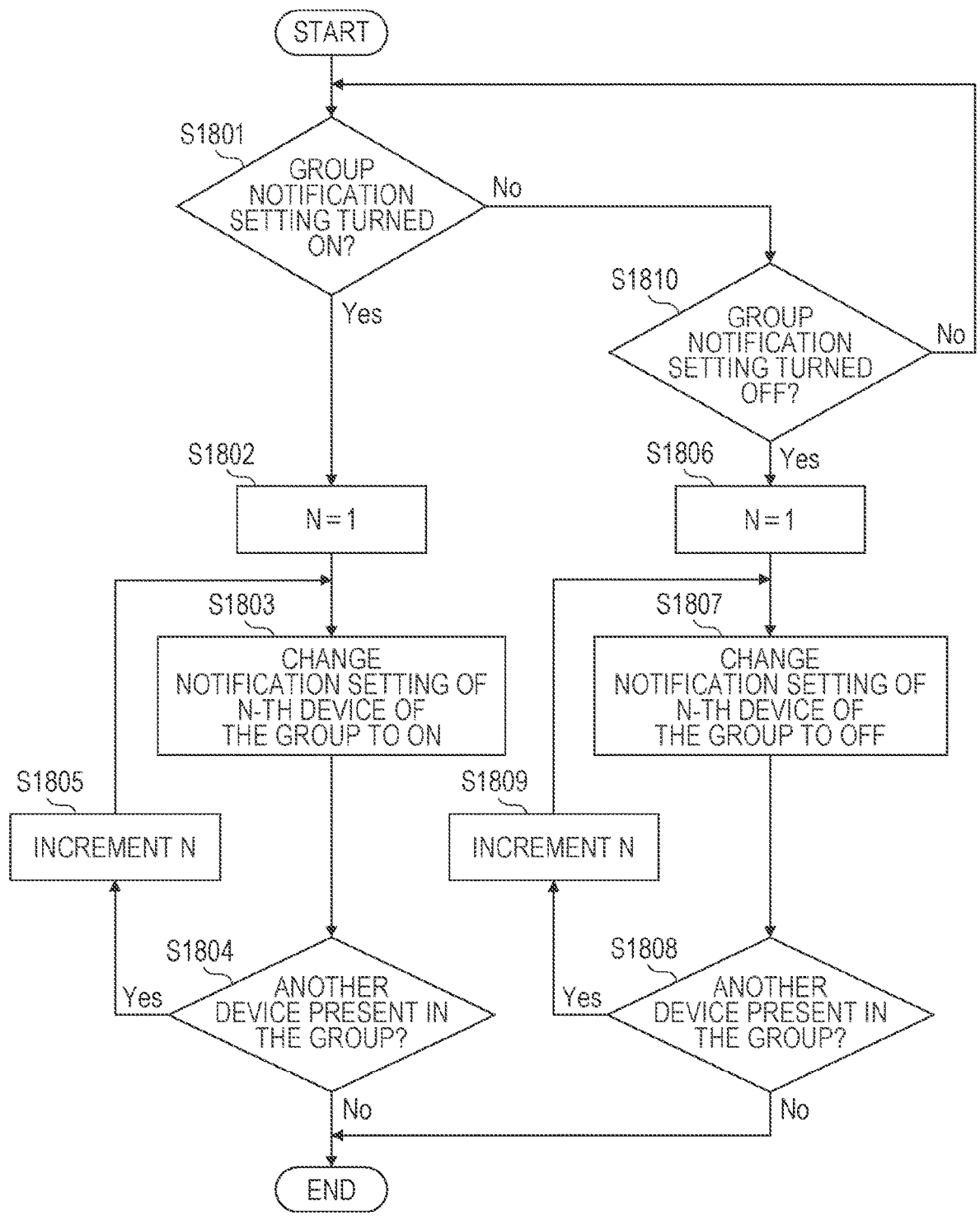
FIG. 18 is a flowchart for a notification switching setting process of the terminal according to one embodiment.

FIG. 18 is a flowchart for a notification switching process that is started when the group notification switch setting 810 on the screen 800 in FIG. 8 displayed on the operation unit 201 of the terminal 200 is selected. The individual operations (steps) in the flowchart are executed by the CPU 206 that reads control programs stored in the ROM 207 or the storage 209 into the RAM 208. Here is an example in which the group notification switch setting 810 is selected. The process shown in the flowchart of FIG. 18 is executed also when the group notification switch setting 813 or the group notification switch setting 817 is selected.

At S1801, the CPU 206 determines whether the group notification switch setting 810 has been changed to ON. When the group notification switch setting 810 is selected by the user, with the group notification switch setting 810 at OFF, the CPU 206 determines that the group notification switch setting 810 is changed to ON. If the CPU 206 determines that the group notification switch setting 810 has been changed to ON, the CPU 206 proceeds to S1802. If the CPU 206 determines that the group notification switch setting 810 has not been changed to ON, the CPU 206 proceeds to S1810.

At S1802, the CPU 206 stores a variable N in the RAM 208 and sets the variable N to 1.

At S1803, the CPU 206 changes the notification setting of the N-th device of the group of the group notification switch setting 810 to ON. If the original notification setting of the N-th device is OFF, the CPU 206 changes the setting to ON. If the original notification setting of the N-th device is ON, the CPU 206 keeps the setting.

At S1804, the CPU 206 determines whether there is another device in the group.

If the CPU 206 determines that there is another device in the group, the CPU 206 proceeds to S1805. If the CPU 206 determines that there is no another device in the group, the CPU 206 ends the process shown in the flowchart of FIG. 18.

If the process is advanced from S1801 to S1810, the CPU 206 determines whether the group notification switch setting 810 has been changed to OFF. If the group notification switch setting 810 is selected by the user, with the group notification switch setting 810 at ON, the CPU 206 determines that the group notification switch setting 810 has been changed to OFF. If the CPU 206 determines that the group notification switch setting 810 has not been changed to OFF, the CPU 206 proceeds to S1806. In contrast, if the CPU 206 determines that the group notification switch setting 810 has not been changed to OFF, the CPU 206 proceeds to S1801.

At S1806, the CPU 206 stores the variable N in the RAM 208 and sets the variable N to 1.

At S1807, the CPU 206 changes the notification setting of the N-th device of the group of the group notification switch setting 810 to OFF. If the original notification setting of the N-th device is ON, the CPU 206 changes the setting to OFF. If the original notification setting of the N-th device is OFF, the CPU 206 keeps the setting.

At S1808, the CPU 206 determines whether there is another device in the group.

If the CPU 206 determines that there is another device in the group, the CPU 206 proceeds to S1809. If the CPU 206 determines that there is no another device in the group, the CPU 206 ends the process shown in the flowchart of FIG. 18.

The on/off notification settings of the individual connected devices, set on the screen 800, are transmitted to the device management server 400 for storage.

Figure 9:
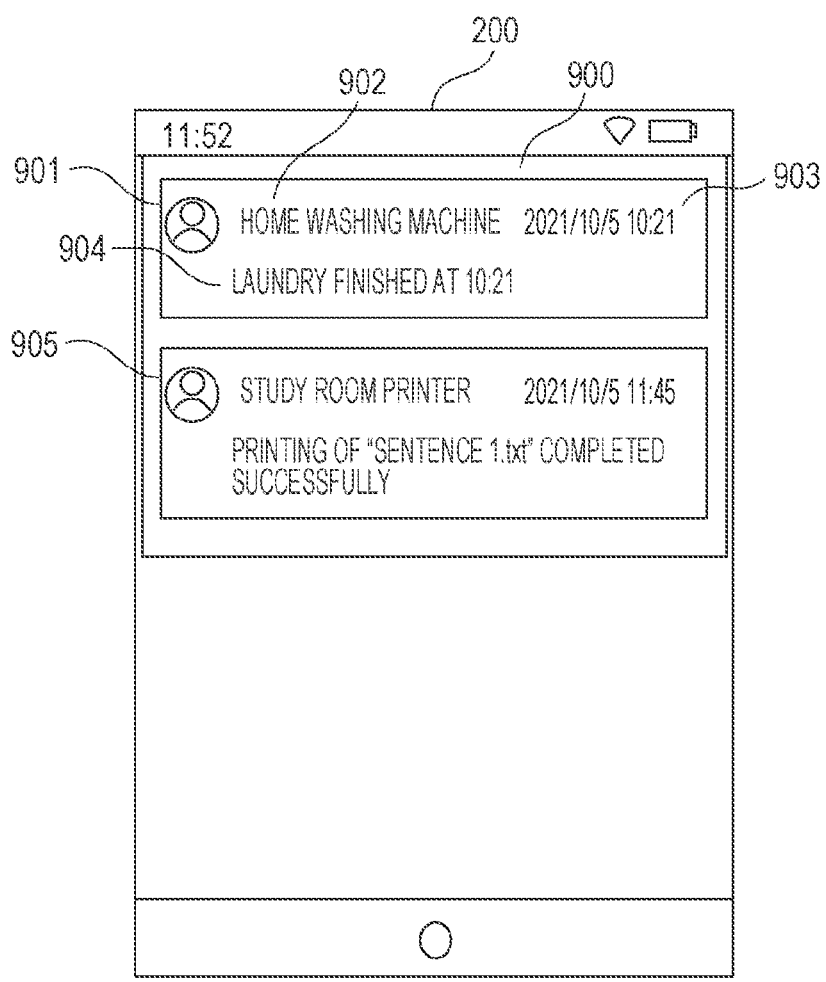
FIG. 9 is a diagram illustrating a notification screen of the terminal according to one embodiment.

FIG. 9 is a diagram illustrating an example of a notification screen displayed on the operation unit 201 of the terminal 200. The notification screen 900 displays notifications of the statuses of connected devices transmitted from the chat server 300. The notification screen 900 displays two notifications 901 and 905. Each notification contains the icon and the name 902 of the connected device, notification date 903, and a message 904 about the status of connected device, as shown in the notification 901. The notification 901 shows that the terminal 200 has received a notification about the status of a connected device named "home washing machine" on "2021, 10 May 10:21". A notification that laundry with "home washing machine" finished at 10:21 is given to the user as a message. Likewise, the notification 905 shows that the terminal 200 has received a notification about the status of a connected device named "study room printer" on "2021, 10 May 11:45". A notification that printing of "study room printer" has been successfully completed is given to the user as a message. The notification screen 900 may be displayed on a chat application that is installed in the terminal 200 and that communicates with the chat server 300 to provide a chat service. Alternatively, the notification screen 900 may be displayed on a status area or a lock screen that is normally displayed on the operation unit 201.

Figure 10:
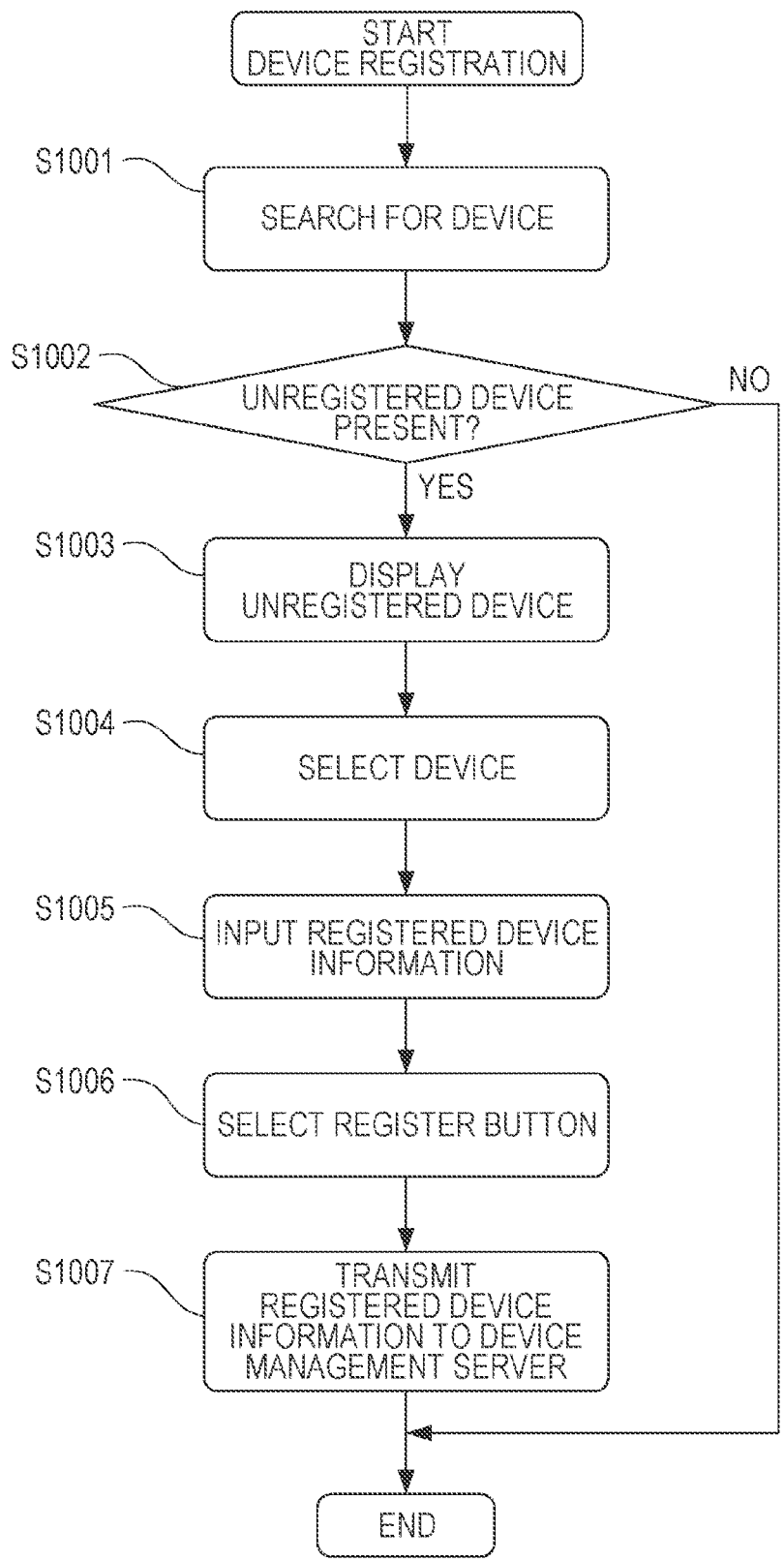
FIG. 10 is a flowchart for a device registration process of the terminal according to one embodiment.

FIG. 10 is a flowchart for device registration started when the add device button 603 on the screen 600a displayed on the operation unit 201 of the terminal 200. The individual operations (steps) in the flowchart are executed by the CPU 206 that reads control programs stored in the ROM 207 or the storage 209 into the RAM 208.

At S1001, the CPU 206 searches for a device to be registered with the device management server 400 and obtains identification information for uniquely identifying the device. For a method of search, devices on the same network (LAN) may be detected according to an address resolution protocol (ARP) via the communication unit 205. Alternatively, devices may be detected via a short-range communication, such as the NFC 203 or the Bluetooth 204. Examples of the identification information include the media access control (MAC) address or the serial number of each device.

At S1002, the CPU 206 determines whether the identification information on the devices found by the search of S1001 have been registered with the device management server 400 by inquiring the device management server 400. If the result of the inquiry shows that the devices found at S1001 include one or more device that are not registered with the device management server 400, the process goes to S1003. In contrast, if there is no device that is not registered with the device management server 400, the device registering process ends.

At S1003, the CPU 206 displays a list of devices that are determined not to be registered with the device management server 400 at S1002 on the screen 600b.

At S1004, the terminal 200 receives selection of any one of the devices displayed on the screen 600b by an operation on the operation unit 201.

At S1005, the CPU 206 enters information necessary as registered-unit information, such as the name of the device selected at S1004, on the screen 600c.

At S1006, the terminal 200 receives selection of the register button 607 displayed on the screen 600c via the operation unit 201.

At S1007, the CPU 206 transmits the registered-unit information to the device management server 400 via the communication unit 205.

Figure 11:
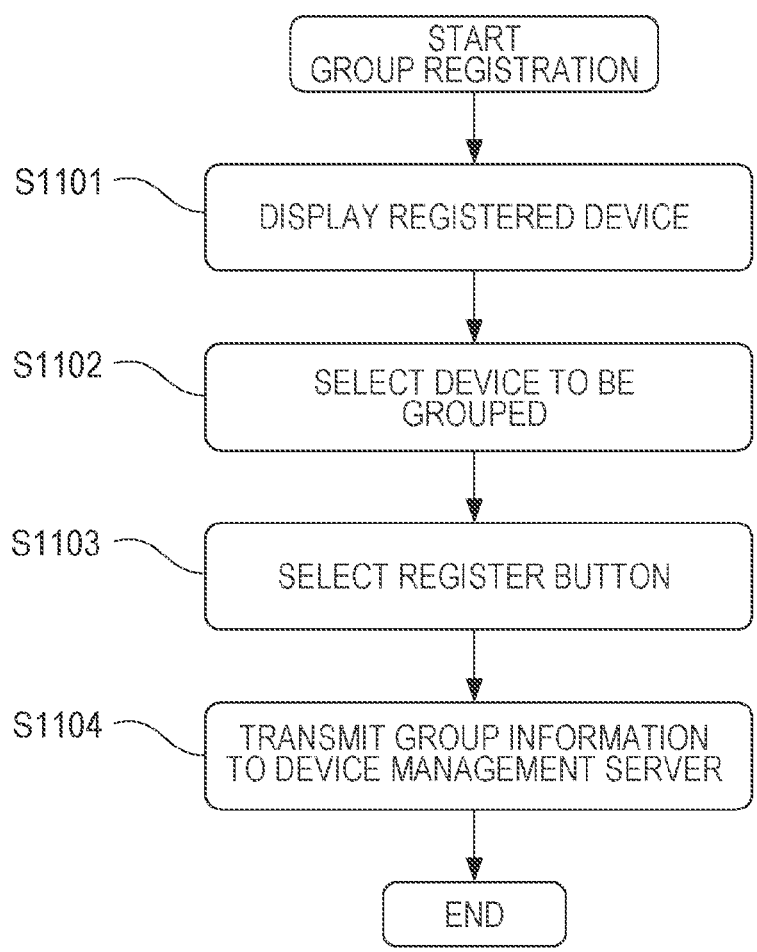
FIG. 11 is a flowchart for device group registration of the terminal according to one embodiment.

FIG. 11 is a flowchart for group registration started when a new-group register button 703 on the screen 700a displayed on the operation unit 201 of the terminal 200. The individual operations (steps) in the flowchart are executed by the CPU 206 that reads control programs stored in the ROM 207 or the storage 209 into the RAM 208.

At S1101, the CPU 206 obtains registered-unit information registered with the device management server 400 and displays a list of the registered devices on the screen 700b. At S1101, the device management server 400 transmits only the registered-unit information that the user who is executing this flowchart registers to the terminal 200. The registered-unit information to be transmitted by the device management server 400 may be changed according to other conditions.

At S1102, the terminal 200 receives the entry of a group name into a group name field 604 on the screen 700b from the user and selects one or more connected devices to be grouped.

At S1103, the terminal 200 receives selection on the register button 607 displayed on the screen 700c from the user.

At S1104, the CPU 206 transmits group information to the device management server 400 via the communication unit 205.

Figure 12:
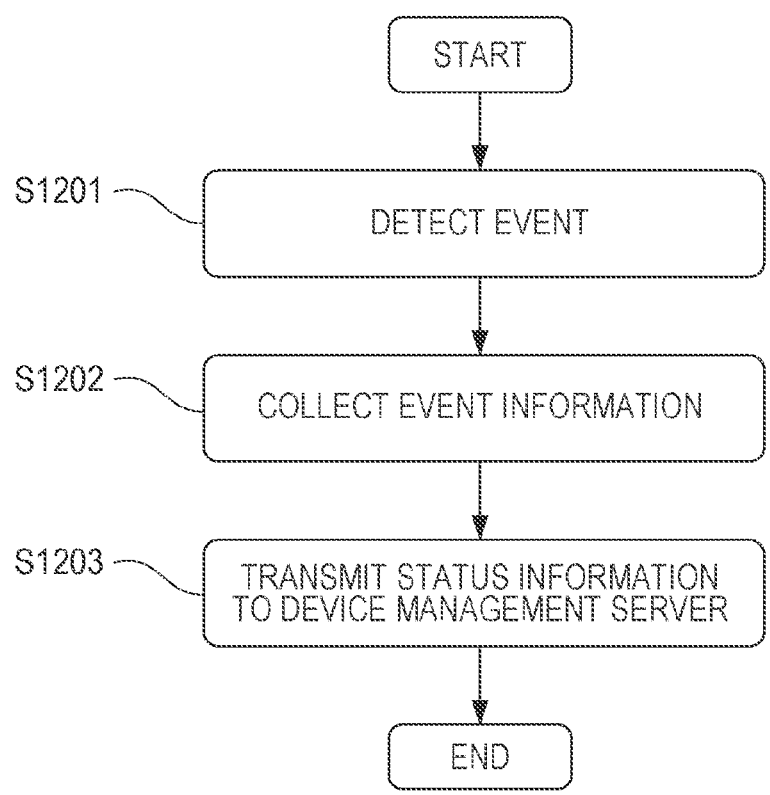
FIG. 12 is a flowchart for the notification process of an MFP according to one embodiment.

FIG. 12 is a flowchart for the process whereby the MFP 1 (500a) transmits status information to the device management server 400. The individual operations (steps) in the flowchart are executed by the CPU 501a that reads control programs stored in the ROM 502a or the storage 504a into the RAM 503a.

At S1201, the CPU 501a detects an event. Examples of the event include completion of copying, faxing, or another job executed by the MFP 1 (500a), the fact that the remaining amount of toner or printing paper has fallen below a predetermined threshold, and the occurrence of a failure. An instruction to transmit status information from the device management server 400 is also included in the event.

At S1202, the CPU 501a collects status information to be transmitted to the device management server 400. The status information collected by the CPU 501a includes the operating status of the MFP 1 (500a), setting information, error information, and event type. The information to be collected may be changed according to the event. For example, in the case of the event of job completion, the type and date of the completed job and the result of the job may be collected, and in the case of the event of a failure, information on the failure location and failure date may be collected.

At S1203, the CPU 501a controls the communication unit 508a so that the communication unit 508a transmits the collected status information to the device management server 400.

Figure 13:
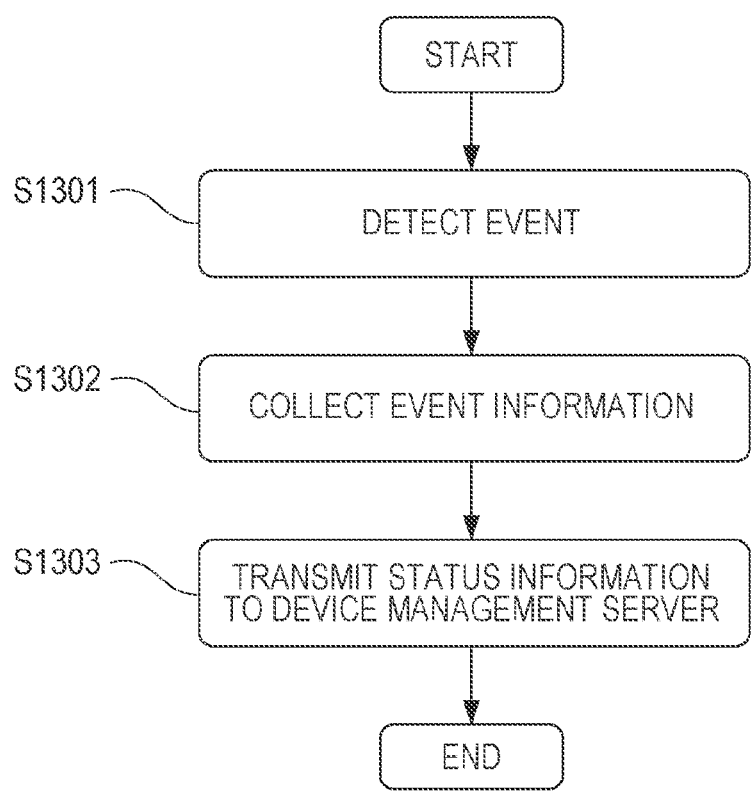
FIG. 13 is a flowchart for the notification process of a printer according to one embodiment.

FIG. 13 is a flowchart for the process whereby the printer (500c) transmits status information to the device management server 400. The individual operations (steps) in the flowchart are executed by the CPU 501c that reads control programs stored in the ROM 502c or the storage 504c into the RAM 503c.

At S1301, the CPU 501c detects an event. Examples of the event include completion of printing or another job executed by the printer (500c), the fact that the remaining amount of toner or printing paper has fallen below a predetermined threshold, and the occurrence of a failure. An instruction to transmit status information from the device management server 400 is also included in the event.

At S1302, the CPU 501c collects status information to be transmitted to the device management server 400. The status information collected by the CPU 501c includes the operating status of the printer (500c), setting information, error information, and event type. The information to be collected may be changed according to the event. For example, in the case of the event of job completion, the type and date of the completed job and the result of the job may be collected, and in the case of the event of a failure, information on the failure location and failure date may be collected.

At S1303, the CPU 501c controls the communication unit 507c so that the communication unit 507c transmits the collected status information to the device management server 400.

Figure 14:
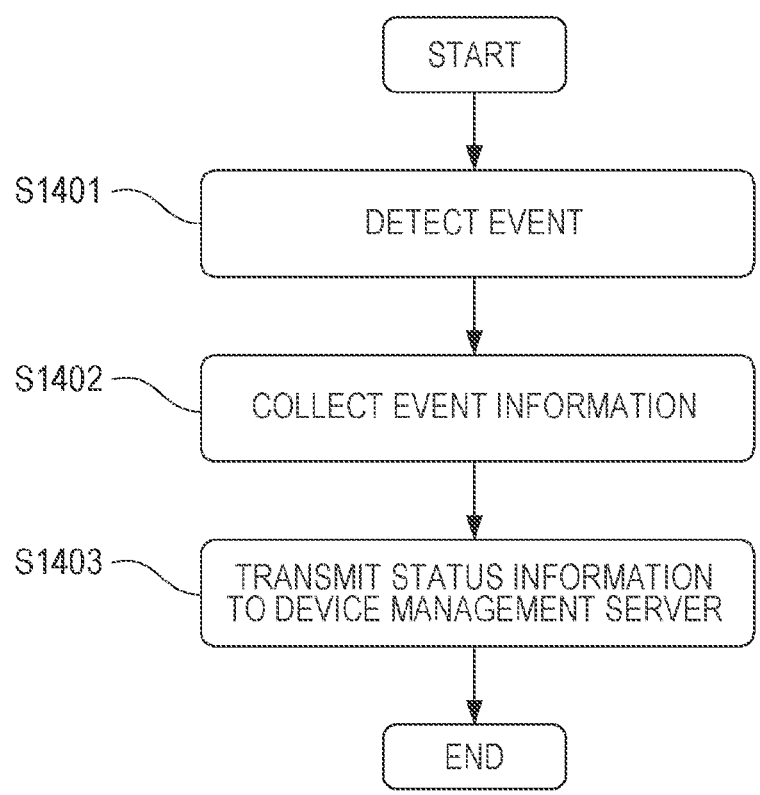
FIG. 14 is a flowchart for the notification process of a washing machine according to one embodiment.

FIG. 14 is a flowchart for the process whereby the washing machine (500d) transmits status information to the device management server 400. The individual operations (steps) in the flowchart are executed by the CPU 501d that reads control programs stored in the ROM 502d into the RAM 503d.

At S1401, the CPU 501d detects an event. Examples of the event include completion of laundry, the fact that it is detected that operation cannot be continued because of inability of supply water or an open lid, and the occurrence of a failure. An instruction to transmit status information from the device management server 400 is also included in the event.

At S1402, the CPU 501d collects status information to be transmitted to the device management server 400. The status information collected by the CPU 501d includes the operating status of the washing machine (500d), setting information, error information, and event type. The information to be collected may be changed according to the event. For example, in the case of the event of completion of laundry, the date of the completion of laundry may be collected, and in the case of the event of a failure, information on the failure location and failure date may be collected.

At S1403, the CPU 501d controls the communication unit 507d so that the communication unit 507d transmits the collected status information to the device management server 400.

Figure 15:
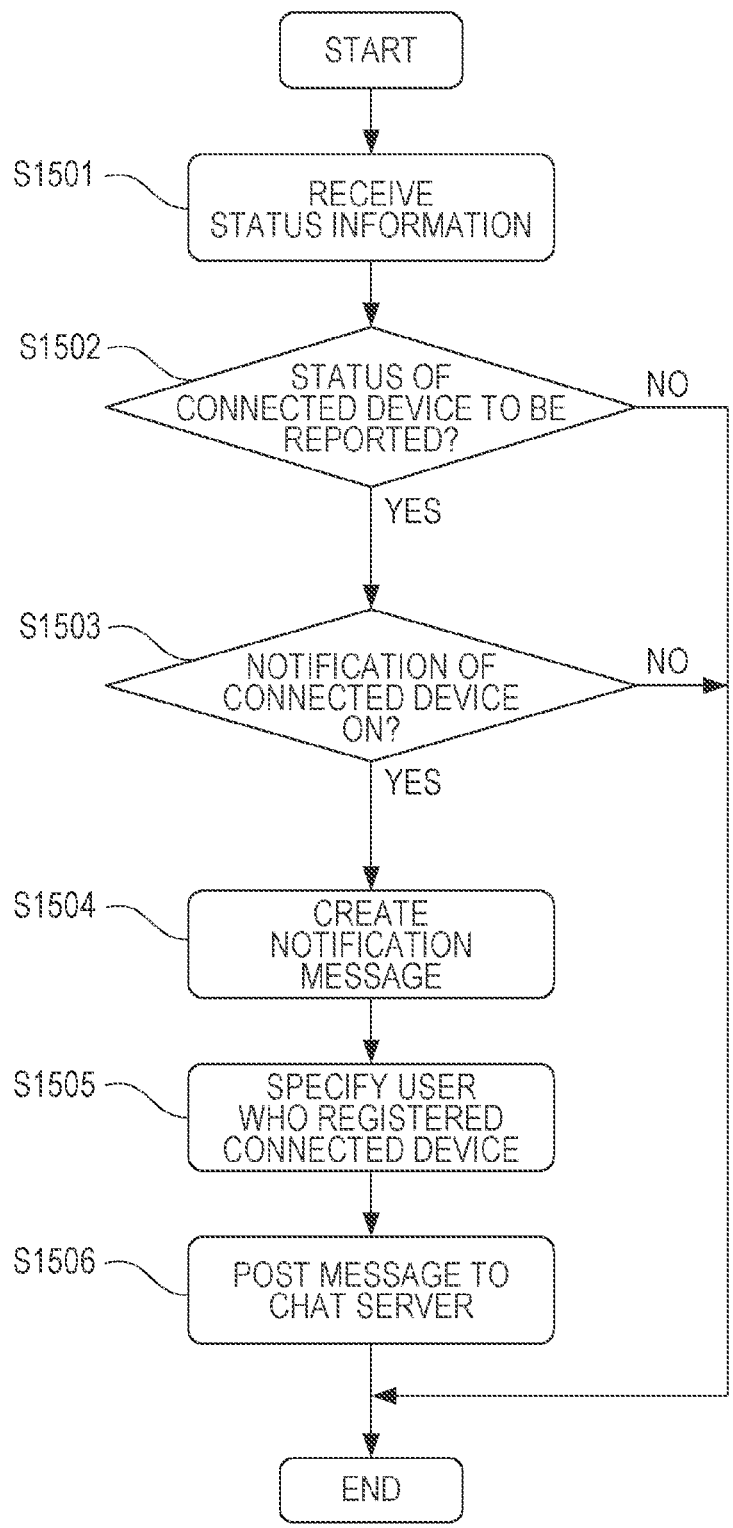
FIG. 15 is a flowchart for the notification process of the device management server according to one embodiment.

FIG. 15 is a flowchart for the process whereby the device management server 400 transmits status information obtained from the connected device 500 to the chat server 300. The individual operations (steps) in the flowchart are executed by the CPU 403 that reads control programs stored in the ROM 404 or the HDD 402 into the RAM 405.

At S1501, the CPU 403 stores the status information received by the communication unit 401 in the HDD 402.

At S1502, the CPU 403 analyzes the status information received at S1501 to determine whether the status of the connected device 500 is to be reported to the user. Examples of the status to be reported include that completion of the process executed by the connected device 500 and detection of a failure of the connected device 500 are included in the status information. Notification conditions to be used for the determination of whether to give a notification are stored in advance in the HDD 402 of the device management server 400. Alternatively, the notification conditions may be set by the user for each connected device. For example, assuming that notification conditions for the MFP 1(500a) include "completion of printing of a received fax document", when the CPU 403 determines that status information includes an event type indicating completion of the printing of a received fax document, the CPU 403 determines that the status is to be reported to the user. If the CPU 403 determines to report the status as a result of analysis, the process goes to S1503. If not, the flowchart ends.

At S1503, the CPU 403 obtains the notification setting of the connected device 500 that is determined to be reported at S1502. If the setting is "ON", the process goes to S1504. If the setting is "OFF", the flowchart ends. Although, at S1503, the group notification switch setting determines where the process branches off, the notification setting of the connected device that is determined to be reported may be used for the branch.

At S1504, the CPU 403 creates a notification message. The notification message is created on the basis of the status information. The message may be created using a format determined for each event type, or a fixed message set by the user may be used. The notification message may include the name and the type of the connected device, an icon, and other information.

At S1505, the CPU 403 searches the registered-unit information stored in the HDD 402 for user information on the user who registers the connected device 500 that is determined to be reported at S1502.

At S1506, the CPU 403 transmits the user ID and the notification message created at S1504 to the chat server 300 so that the notification message is sent to the user specified at S1505.

Figure 16:
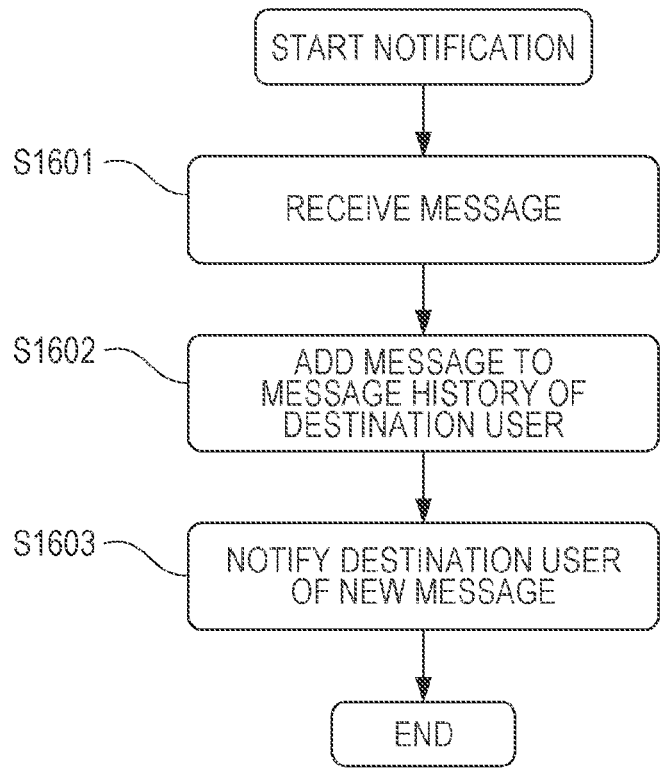
FIG. 16 is a flowchart for the notification process of the chat server according to one embodiment.

FIG. 16 is a flowchart for the process whereby the chat server 300 notifies the terminal 200 of the notification message sent from the device management server 300. The individual operations (steps) in the flowchart are executed by the CPU 304 that reads control programs stored in the ROM 305 or the HDD 302 into the RAM 306.

At S1601, the CPU 304 detects reception of the notification message and the destination, or the user ID, transmitted from the device management server 400 via the communication unit 301.

At S1602, the CPU 304 stores the notification message received at S1601 in the message history of the destination user. The notification message stored in the message history can be tracked back by the user.

At S1603, the CPU 304 notifies the destination user of the notification message received at S1601. In this embodiment, the notification is provided to the terminal 200 via a distribution server (not shown) that makes a push notification by transmitting the notification message and the identifier of the terminal 200 of the user to the distribution server.

Figure 17:
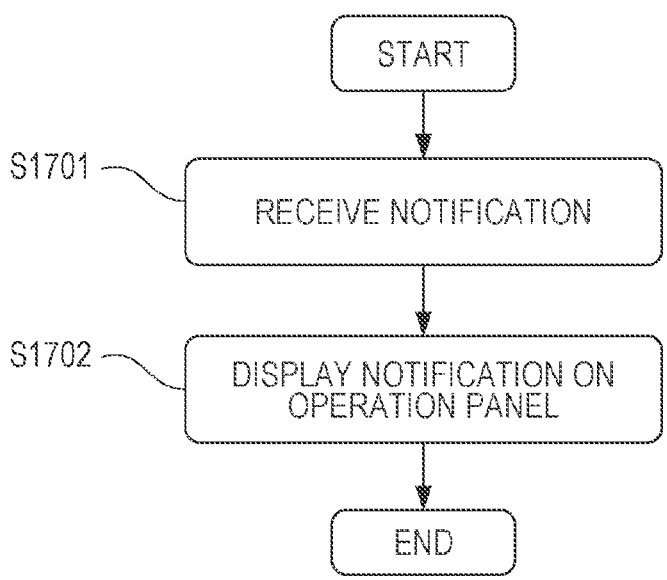
FIG. 17 is a flowchart for the notification display process of the terminal according to one embodiment.

FIG. 17 is a flowchart for the process whereby the terminal 200 displays the notification message transmitted from the chat server 300. The individual operations (steps) in the flowchart are executed by the CPU 206 that reads control programs stored in the ROM 207 or the storage 209 into the RAM 208.

At S1701, the CPU 206 detects the communication unit 205 having received the notification message transmitted from chat server 300.

At S1702, the CPU 206 displays the notification message received at S1701 on the notification screen 900.

This embodiment shows an example in which the device management server 400 determines at S1503 whether to generate a notification message at S1504. However, embodiments of the present disclosure are not limited to the above example. For example, the device management server 400 may omit step S1503 and necessarily perform the creation and the posting of the notification message from steps S1504 to S1506 to the chat server 300 and may operate as follows. The terminal 200 may access the chat server 300 to determine whether to display the notification message on the notification screen 900 according to a group notification switch setting or a connected-device notification setting. In this case, the chat server 300 dese not transmit the notification message to the distribution server and only adds the message to the history at S1602. The terminal 200 determines whether to display the notification message at the timing when the chat server 300 obtains the history of the message.

Alternatively, the device management server 400 may omit step S1503 and necessarily perform the creation and the posting of the notification message from steps S1504 to S1506 to the chat server 300 and may operate as follows. The device management server 400 may determine whether to transmit the notification message and the identifier of the terminal 200 of the user to a distribution server (not shown) that makes a push notification on the basis of the notification setting of the connected device whose status information is transmitted. If the connected-device notification setting is enabled, the device management server 400 instructs the chat server 300 to transmit the notification message and the identifier of the terminal 200 of the user to the distribution server (not shown). This enables the terminal 200 to display the notification message on a lock screen or the like even without a notification display instruction from the user. If the connected-device notification setting is disabled, the device management server 400 instructs the chat server 300 not to transmit the notification message and the identifier of the terminal 200 of the user to the distribution server (not shown). In this case, the terminal 200 does not need to display the notification message on the lock screen or the like.

Thus, one or more connected devices can be registered with groups, and settings of notifications to the operation unit 201 of the terminal 200 based on information from the plurality of devices that belong to the plurality of groups can be changed all at once for each group. This eliminates, when the user wants to receive notifications from home electrical appliance, the need to enable the respective notification settings of the study room printer 805, the home kitchen rice cooker 815, and the home washing machine 816. By selecting the group notification switch setting 813 instead, the settings of a plurality of connected devices registered with a home electrical appliance group can be changed all at once.

Thus, when leaving the office, the user can change the notification settings based on the information on the connected devices in the head office printer group to OFF all at once using the group notification switch setting 810. When coming home, the user can turn on the notification settings based on the information on the connected devices in the home electrical appliance group all at once using the group notification switch setting 813.

The enable/disable of the notification settings of the individual connected devices set on the screen 800 may be stored in the chat server 300, and the chat server 300 may determine whether to post messages of the connected devices. If the notification setting of a certain connected device set on the screen 800 is enabled, the chat server 300 stores the enabled notification setting of the connected device. When a notification of the status information on the connected device is given, the chat server 300 posts a message based on the notification. In contrast, if the notification setting of a certain connected device set on the screen 800 is disabled, the chat server 300 stores the disabled notification setting of the connected device. When a notification of the status information on the connected device is given, the chat server 300 does not post a message based on the notification. This is an example of whether to perform posting. Alternatively, a push notification of a message to the terminal 200 may be performed. If the notification setting of a certain connected device set on the screen 800 is enabled, the chat server 300 stores the enabled notification setting of the connected device. When a notification of the status information of the connected device is given, the chat server 300 transmits the notification message and the identifier of the terminal 200 of the user to a distribution server (not shown) that makes a push notification. In other words, the chat server 300 makes the lock screen or the home screen of the terminal 200 automatically display the message even if no message display instruction is given by the user. In contrast, if the notification setting of a certain connected device set on the screen 800 is disabled, the chat server 300 stores the disabled notification setting of the connected device. When a notification of the status information of the connected device is given, the chat server 300 does not transmit the notification message and the identifier of the terminal 200 of the user to the distribution server (not shown) that makes a push notification. In other words, the chat server 300 makes the lock screen or the home screen of the terminal 200 not to automatically display the message. This facilitates setting of whether to post a message or make a push notification on the basis of a connected-device notification setting by the user via the screen 800.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments are described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-186701, filed Nov. 16, 2021, which is hereby incorporated by reference herein in its entirety.

What is claimed is:

1. A method comprising:
   registering a plurality of devices,
   wherein two or more devices of the plurality of devices are also registered in association with a first group of a plurality of groups, and
   wherein another device of the plurality of devices is not registered in association with any group of the plurality of groups; and
   changing, at a user interface, a notification setting so that notifications are enabled for one or more of the plurality of devices, the notifications to be transmitted to an information processing apparatus,
   wherein
   each notification is based on information about a status or condition of a corresponding device, and
   the user interface is configured in such a manner that the changing of a notification setting is made by selecting a notification setting from among a plurality of notification settings, the plurality of notification settings including:
   a first notification setting by which notifications for a device associated with the first group are enabled without enabling notifications for other one or more devices in the first group, and
   a second notification setting by which notification settings for each of the two or more devices associated with the first group are changed based on a single user input;
   transmitting, to the information processing apparatus, notifications concerning the one or more of the plurality of devices for which notification settings are enabled.

2. The method according to claim 1, wherein, based on the second notification setting, notification settings for the two or more devices in the first group, are able to be changed all at once without changing a setting of a notification to be transmitted to the information processing apparatus based on information from a device in another group.

3. The method according to claim 1, wherein respective settings of respective notifications of the two or more devices in the first group are individually changed separately from settings of a plurality of notifications to be transmitted based on the information from the two or more devices in the first group.

4. The method according to claim 1, wherein a settings of the respective notifications of a device of the plurality of devices that is not registered with any group is changed.

5. The method according to claim 4, wherein the plurality of notification settings includes a third notification setting by which settings of notifications of devices that are not registered with any group are changed all at once.

6. The method according to claim 1, the method further comprising:
   creating an additional group.

7. The method according to claim 1, wherein information from the two or more devices associated with the first group comprises information based on events generated in the plurality of devices.

8. The method according to claim 1, wherein the plurality of devices includes a multifunctional device that performs printing.

9. The method according to claim 8, wherein the information comprises information that indicates shortage of recording materials in the multifunctional device.

10. The method according to claim 1, wherein the information processing apparatus comprises a smartphone.

11. A system comprising:
    a device management server configured to obtain device information from a plurality of devices;
    a chat server configured to transmit, to an information processing apparatus, notifications based on the device information obtained by the device management server;
    one or more processors; and
    one or more memories storing instructions that, when executed by the one or more processors, causes an apparatus to perform functions of:
    a registration unit configured to register the plurality of devices, wherein two or more devices of the plurality of devices are also registered in association with a first group of a plurality of groups;
    a setting unit configured to receive, at a user interface, a notification setting so that notifications are enabled for one or more of the plurality of devices, the notifications to be transmitted to the information processing apparatus,
    wherein
    each notification is based on information about a status or condition of the a corresponding device, and
    the user interface is configured in such a manner that the notification setting is received via a selection of a notification setting from among a plurality of notification settings, the plurality of notification settings including:
    a first notification setting by which notifications for a device associated with the first group are enabled without enabling notifications for other one or more devices in the first group, and a second notification setting by which notification settings for each of the two or more devices associated with the first group are changed based on a single user input;

a determination unit configured to determine whether notifications are set to be enabled by the setting unit;

a generation unit configured to, when the determination unit determines that the notifications are set to be enabled, generate notifications based on the device information; and a transmission unit configured to transmit the notifications generated by the generation unit to the information processing apparatus.

12. A computer-readable storage medium storing a program for causing a computer to perform a method, the method comprising:

registering a plurality of devices;

wherein two or more devices of the plurality of devices are also registered in association with a first group of a plurality of groups; and wherein another device of the plurality of devices is not registered in association with any group of the plurality of groups; and changing, at a user interface, a notification setting so that notifications are enabled for one or more of the plurality of devices, the notifications to be transmitted to an information processing apparatus, wherein each notification is based on information about a status or condition of the a corresponding device, and the user interface is configured in such a manner that the changing of a notification setting is made by selecting a notification setting from among a plurality of notification settings, the plurality of notification settings including:

a first notification setting by which notifications for a device associated with the first group are enabled without enabling notifications for other one or more devices in the first group, and a second notification setting by which notification settings for each of the two or more devices associated with the first group are changed based on a single user input.

13. An information processing apparatus comprising:

one or more processors; and one or more memories storing instructions that, when executed by the one or more processors, causes the information processing apparatus to perform functions of:

a first registration unit configured to register a plurality of devices;

wherein two or more of the plurality of devices is also registered in association with a first group of a plurality of groups; and wherein another device of the plurality of devices is not registered in association with any group of the plurality of groups; and a changing unit configured to change, at a user interface, a notification setting so that notifications are enabled for one or more of the plurality of devices, the notifications to be transmitted to another information processing apparatus, wherein each notification is based on information about a status or condition of a corresponding device, and the user interface is configured in such a manner that the changing of a notification setting is made by selecting a notification setting from among a plurality of notification settings, the plurality of notification settings including:

a first notification setting by which notifications for a device associated with the first group are enabled without enabling notifications for other one or more devices in the first group, and a second notification setting by which notification settings for each of the two or more devices associated with the first group are changed based on a single user input.

\* \* \* \* \*